US010459988B2

(12) United States Patent
Goel et al.

(10) Patent No.: US 10,459,988 B2
(45) Date of Patent: Oct. 29, 2019

(54) CALCULATING SUPPLY AND DEMAND FOR A FIELD OF STUDY

(71) Applicant: Microsoft Technology Licensing, LLC, Redmond, WA (US)

(72) Inventors: Mudit Goel, Sunnyvale, CA (US); Yi Feng, Sunnyvale, CA (US); Weizhen Wang, San Jose, CA (US); Dong Li, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 586 days.

(21) Appl. No.: 14/815,557

(22) Filed: Jul. 31, 2015

(65) Prior Publication Data

US 2017/0032037 A1 Feb. 2, 2017

(51) Int. Cl.
*G06Q 50/20* (2012.01)
*G06F 16/951* (2019.01)

(52) U.S. Cl.
CPC ....... *G06F 16/951* (2019.01); *G06Q 50/2057* (2013.01)

(58) Field of Classification Search
CPC .. G06Q 50/205; G06Q 50/20; G06Q 50/2057; G06F 16/951
USPC .......................................................... 705/328
See application file for complete search history.

(56) References Cited

U.S. PATENT DOCUMENTS 7,054,864 B1 * 5/2006 Toomey ................. G06Q 10/00
8,001,057 B1 * 8/2011 Hill .................... G06Q 10/1053 705/1.1
8,082,168 B1 * 12/2011 Judy ................ G06Q 10/06311 705/7.14
2006/0105315 A1 * 5/2006 Shaver ................... G06Q 10/02 434/362
2006/0195346 A1 * 8/2006 Tommey ................ G06Q 10/00
2008/0065467 A1 * 3/2008 Nyegaard .............. G06Q 10/00 705/7.32

(Continued)

OTHER PUBLICATIONS

Carnevale, Anthony P.; Cheah, Ban; Hanson, Andrew R.; 'The Economic Value of College Majors,' Georgetown University McCourt School of Public Policy Center on Education and the Workforce, https://cew.georgetown.edu/cew-reports/valueofcollegemajors/, May 7, 2015 (Year: 2015).*

*Primary Examiner* — Amanda C Abrahamson
(74) *Attorney, Agent, or Firm* — Schwegman Lundberg & Woessner, P.A.

(57) ABSTRACT

Techniques for presenting a recommendation to a member of a social network in a specific field of study are described. A predictor can access, from a database in the social network, educational data of a plurality of students and post-graduate data of a plurality of graduates in the social network. Additionally, the predictor can determine a subset of students associated with a specific field of study, and can calculate a demand for the specific field of study based on the accessed data. A recommendation generator can calculate a competition value for the specific field of study based on the determined subset of students and the calculated demand for the specific field of study. Subsequently, the recommendation generator can cause a presentation, on a display of a device, of a recommendation associated with the specific field of study, the recommendation being based on the calculated competition value.

20 Claims, 14 Drawing Sheets

(56) References Cited

U.S. PATENT DOCUMENTS

2011/0313963 A1* 12/2011 Liu ........................ G06Q 10/06 706/48
2014/0101143 A1* 4/2014 Zhang .............. G06Q 10/06311 707/723
2015/0161566 A1* 6/2015 Cai .................... G06O 10/1053 705/321
2016/0019505 A1* 1/2016 Kamangar ......... G06Q 10/1053 381/321

* cited by examiner

800

| | HIGH COMPETITION | LOW COMPETITION |
|---|---|---|
| LOW DISPERSION | 810 **SWITCH** | 820 **STAY** |
| HIGH DISPERSION | 830 **SWITCH OR STAND OUT AND BE PROACTIVE** | **STAY AND BE PROACTIVE** 840 |

*FIG. 8*

1310 — Hey CS major! Good choice with your major. Easily find jobs now.

1320 — Hey Sophomore! You major has low demand but we can help you find internships now.

1330 — High competition alert! See tips to stand out in your Architecture major.

1340 — Juniors! Math majors are choosing Consulting as their career. Find internships now.

1350 — Hey Freshman! See why you should consider CS minor.

CALCULATING SUPPLY AND DEMAND FOR A FIELD OF STUDY

TECHNICAL FIELD

The subject matter disclosed herein generally relates to generating a recommendation for a student in a specific field of study based on a supply and demand for the specific field of study. Specifically, the present disclosure generally relates to techniques for calculating a present and future supply for a field of study, and techniques for calculating a present and future demand for a field of study based on data stored in a social network system.

BACKGROUND

A social network system can maintain information on members, companies, organizations, employees, and employers. The social network system may maintain profile pages of members, which can include education information about a specific member. Additionally, the social network system can also include a directory of company pages, which can include employment information about a specific company.

In some instances, a student (e.g., college student) can select a field of study without knowing the employability of the selected field of study. Additionally, graduate school enrollment for different fields of study may have different acceptance rates. Moreover, employment rates for different fields of study may vary based on the field of study. Furthermore, salary ranges for graduates may vary based on the field of study. Often, some useful information that is specifically tailored to a student or field of study may be missing or otherwise unavailable to a student.

BRIEF DESCRIPTION OF THE DRAWINGS

Some embodiments are illustrated by way of example and not limitation in the figures of the accompanying drawings.

FIG. 8 illustrates a table for recommendation and alert generation based on the competition value and the dispersion value, according to some embodiments.

DETAILED DESCRIPTION

Figure 1:
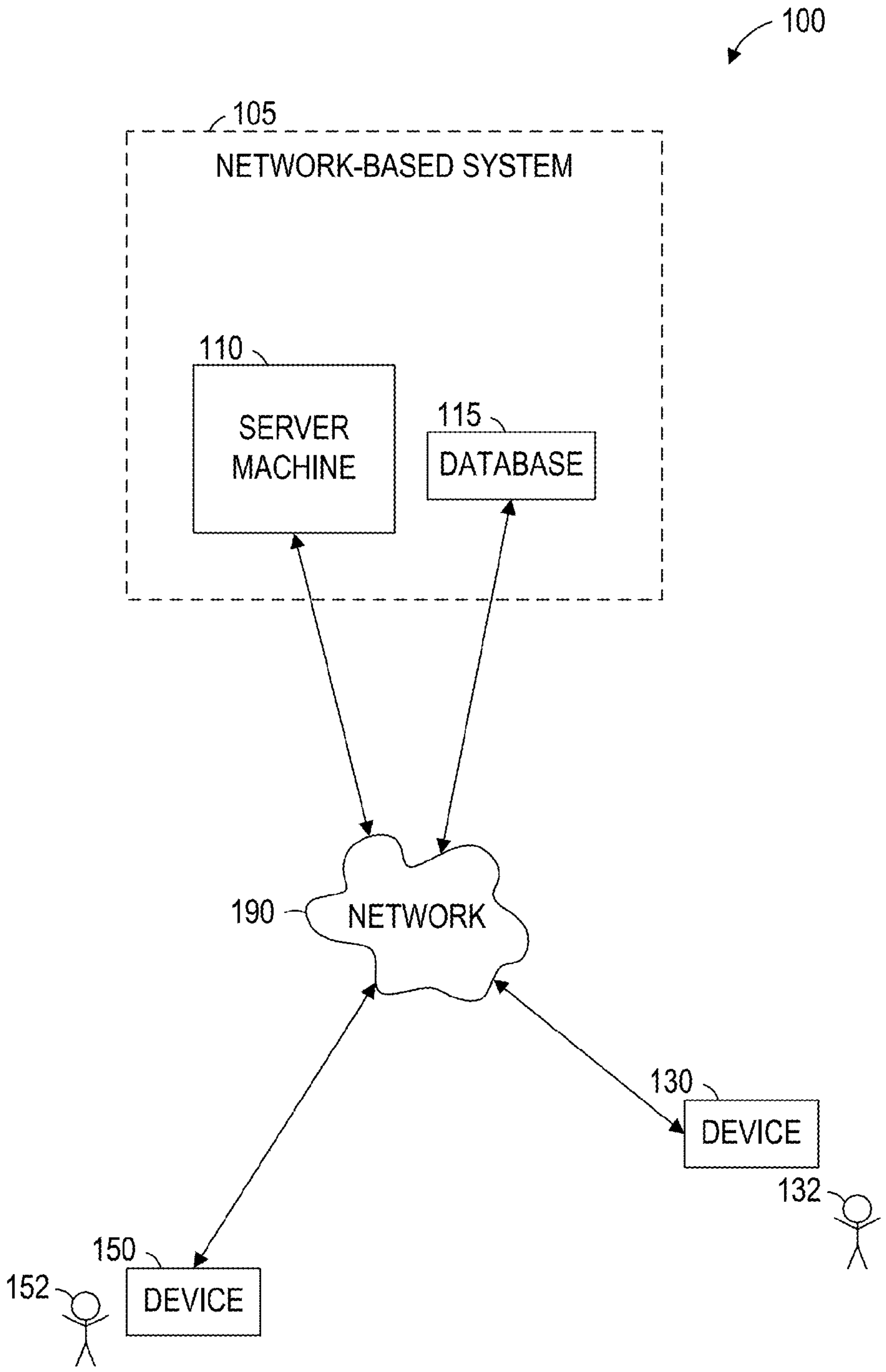
FIG. 1 is a network diagram illustrating a network environment suitable for a social network, according to some example embodiments.

Example methods and systems are directed to techniques for determining a recommendation to a student in a specific field of study based on a competition value or dispersion value. More specifically, the present disclosure relates to methods, systems, and computer program products for determining a competition value and dispersion value based on information accessed from member profile data. Techniques for determining a competition value and a dispersion value are described herein.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A member of a social network can create a member profile page. For example, the profile page of a member can include a location, education information, employer information, and an industry associated with the member. In addition to member profiles, a social network can have company pages of a company with company information relating to the company. The company information can include associated members (e.g., employees), office locations, and number of employees.

As previously discussed, college students may make decisions about their field of study without knowing the employability for the selected field of study. As described herein, the social network system can calculate (e.g., predict, estimate) the supply for a specific field of study. For example, the supply can include the number of students in the specific field of study. Additionally, the social network system can calculate the demand for the specific field of study. For example, the demand can include the number of jobs available and the number of graduate school seats available for students in the specific field of study. Furthermore, based on the supply and the demand, the social network system can present a recommendation or an alert to a student.

Techniques described herein allow for presentation of a recommendation to a member in the social network system, the member being associated with a specific field of study. The recommendation can be based on the competition value for the specific field of study. The competition value can be based on current or future supply calculation of students in the specific field of study. Additionally, the competition value can be based on the current and future demand calculations for the specific field of study. By using the information accessed from the member profiles, a predictor in the social network system can calculate the supply and demand for a specific field of study.

Furthermore, the recommendation can be based on a dispersion value for the specific field of study. The dispersion value can be calculated based on the likelihood of a student in a specific field of study having a pre-defined path for a specific job placement or graduate school placement.

The recommendation can be based on the competition value, and the dispersion value, and can include changing major, taking up a minor, taking online courses, learning vocational skills, participating in an internship early, and so on. The alerts can include an alert on the social network system's decision board, an alert on the profile page of the member, an email sent to the member, and so on.

Additionally, the user input from a member of the social network can initiate (e.g., trigger) the process of automatically generating a recommendation or an alert. In some instances, when the member profile of the member is updated, a recommendation or an alert can be sent to the member. For example, the member profile can be updated to include a college that the member is expected to attend next fall. Therefore, based on the update, a recommendation generator can recommend a field of study for the member.

Furthermore, using social graph information in the social network, the social network system can determine networking contacts connected to the member. The networking contacts can include members of the social network who are associated with the specific field of study. In some instances, the recommendation can include contacting one of the networking contacts for mentoring or job opportunities.

FIG. 1 is a network diagram illustrating a network environment 100 suitable for a social network service, according to some example embodiments. The network environment 100 includes a server machine 110, a database 115, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store, but is not limited to storing, member data, company data, education data, social graph data for the social network service. In some instances, the database 115 can include a plurality of databases (e.g., a first database to store education data, a second database to store post-graduate data). The server machine 110, the first device 130, and the second device 150 may each be implemented in a computer system, in whole or in part, as described below with respect to FIG. 14.

Also shown in FIG. 1 are the users 132 and 152. One or both of the users 132 and 152 may be a human user (e.g., student), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the machines, databases, or devices described herein may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below in FIG. 14. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices described herein may be combined into a single machine, database, or device, and the functions described herein for any single machine, database, or device may be subdivided among multiple machines, databases, or devices.

Figure 2:
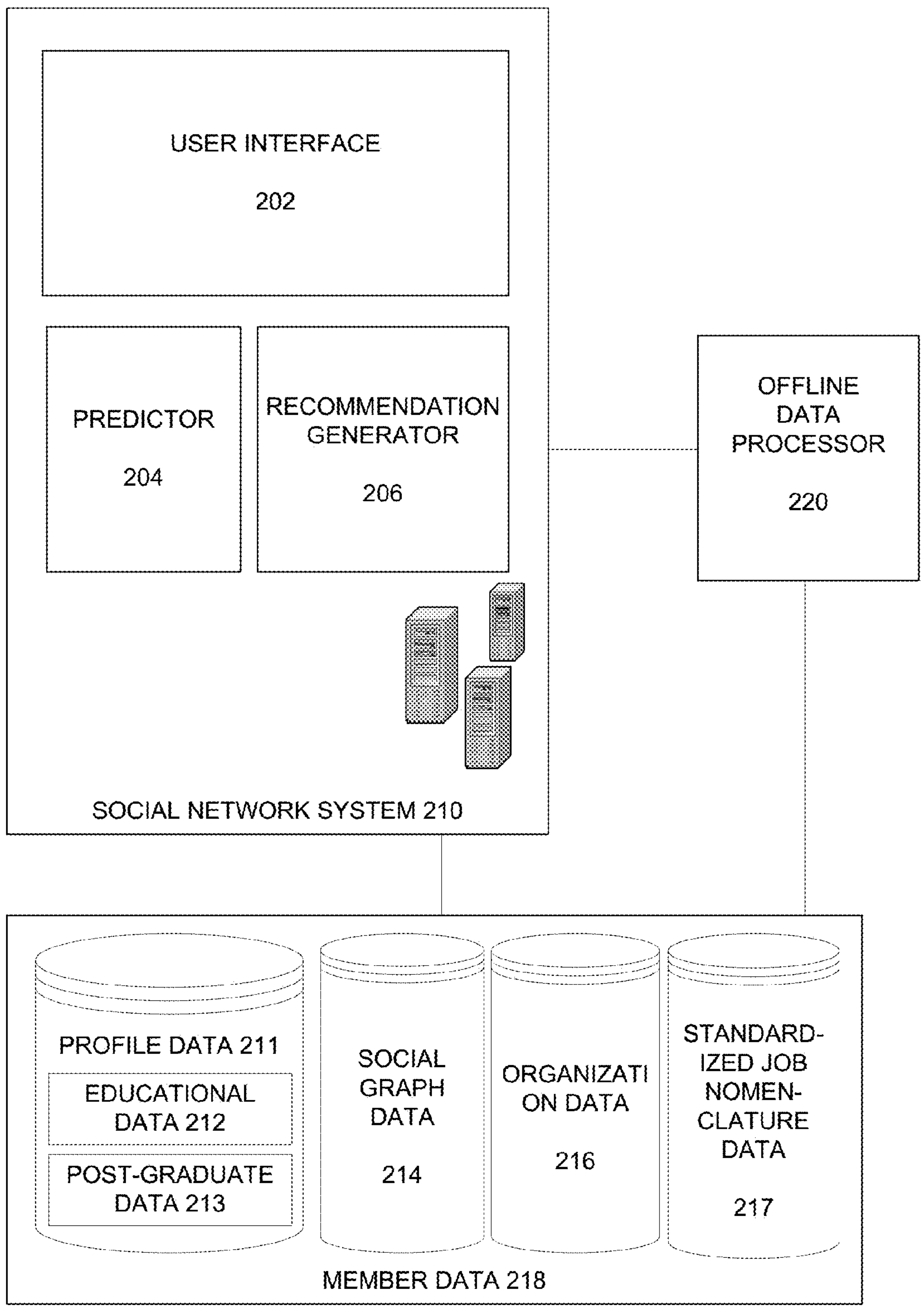
FIG. 2 is a block diagram illustrating various components of a social network service, according to some example embodiments.

FIG. 2 is a block diagram illustrating components of a social network system 210, according to some example embodiments. The social network system 210 is an example of a network-based system 105 of FIG. 1. The social network system 210 can include a user interface 202, a predictor 204, and a recommendation generator 206, all configured to communicate with each other (e.g., via a bus, shared memory, or a switch).

Additionally, the social network system 210 can communicate with the database 115 of FIG. 1, such as a database storing member data 218. The member data 218 can include profile data 211, social graph data 214, organization data 216, and standardized job nomenclature data 217. Using the member data 218, a recommendation or an alert can be determined for a member in a specific field of study.

The member data 218 includes a database for storing the profile data 211, including educational data 212 of a student and post-graduate data 213 of a graduate, if applicable. Additionally, the member data 218 can store the social graph data 214 and the organization data 216. The organization data 216 can include data from a company's profile in the social network system 210, and data from a school's (e.g., university, college) profile in the social network system 210.

The standardized job nomenclature data 217 can include a database of standardized industry types for a company, standardized job titles for employees of the company, and standardized job functions for employees of the company. Additionally, the standardized job titles and job functions can be based on the industry of the company. For example, with regards to the dispersion value, two jobs are considered different if their standardized job titles are different. Similarly, the industry can be further considered to distinguish job titles.

Furthermore, the social network system 210 can be configured to process data offline or periodically using an offline data processor 220. For example, the offline data processor 220 can include Hadoop servers that access the member data 218 periodically (e.g., on a nightly basis) to calculate the competition value and the dispersion value for a field of study. Processing the member data 218, such as determining the supply and demand for a field of study, may be computationally intensive; therefore, due to hardware limitations and to ensure reliable performance of the social network, some determination or calculation by the predictor 204 and the recommendation generator 206 may be done offline. For example, the member data 218 may be processed (e.g., real-time, background/offline) using the predictor 204 and the recommendation generator 206 to determine a recommendation or an alert.

As will be further described with respect to FIGS. 3-7, the recommendation generator 206 in conjunction with the user interface module 202 and the predictor 204 can automatically generate a recommendation or an alert for a member of the social network system 210.

The profile data 211 that is commonly requested and displayed as part of a member's profile includes the member's age, birthdate, gender, interests, contact information, residential address, home town and/or state, spouse and/or family members, educational background (e.g., schools, majors, matriculation and/or graduation dates, etc.), employment history, office location, skills, professional organizations, and so on. In some embodiments, the profile data 211 may include the various skills that each member has indicated he or she possesses. Additionally, the profile data 211 may include skills for which a member has been endorsed.

With certain social network services, such as some business or professional network services, the profile data 211 may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

The profile data 211 can be used to determine the field of study for a member (e.g., student), calculate the supply of students in the field of study, and calculate the demand of students in the field of study. Additionally, the profile data 211 can include educational data 212 relating to a member. The educational data 212 can include the major of the student, the minor of the student, the school ranking of the student, the grade point average (GPA) of the student, and other education-related information. Furthermore, the profile data 211 can include post-graduate data 213 of a graduate. A graduate can be a student who has graduated college. The post-graduate data 213 can include the employment status of the graduate, the number of graduates in a specific job role based on educational characteristics (e.g., major, minor, school, GPA, and so on) of a member. The post-graduate data 213 can include graduate school enrollment information (e.g., graduate school major, ranking of graduate school, acceptance rate of graduate school) based on the educational characteristics of a member.

In some instances, the profile data 211 can include profile page views, company page views, newsfeed postings, and clicking on links on the social network system 210. For example, when the profile data 211 includes page views of a company's profile page, an interest for the industry can be determined by the recommendation generator 206.

Additionally, social network services provide their users with a mechanism for defining their relationships with other people. This digital representation of real-world relationships is frequently referred to as a social graph data 214.

In some instances, the social graph data 214 can be based on a member's presence within the social network service. For example, consistent with some embodiments, a social graph is implemented with a specialized graph data structure in which various members are represented as nodes connected by edges. The social graph data 214 can be used by the recommendation generator 206 to determine a specific recommendation or alert to be presented to a member. For example, the recommendation can be for the member to contact a first-degree connection in the social network system 210 for guidance.

In addition to hosting a vast amount of social graph data 214, the member data 218 can include organization data 216.

In some instances, the organization data 216 can include information available in a company's profile page or a school's profile page. The company's profile page can include office locations, number of employees, connections to current employees, job opportunities, salary range for a specific job role, and so on. The school's profile page can include location, number of students, program information, availability of different field of studies, enrollment information, acceptance rate, available seats for different majors, and so on.

Figure 3:
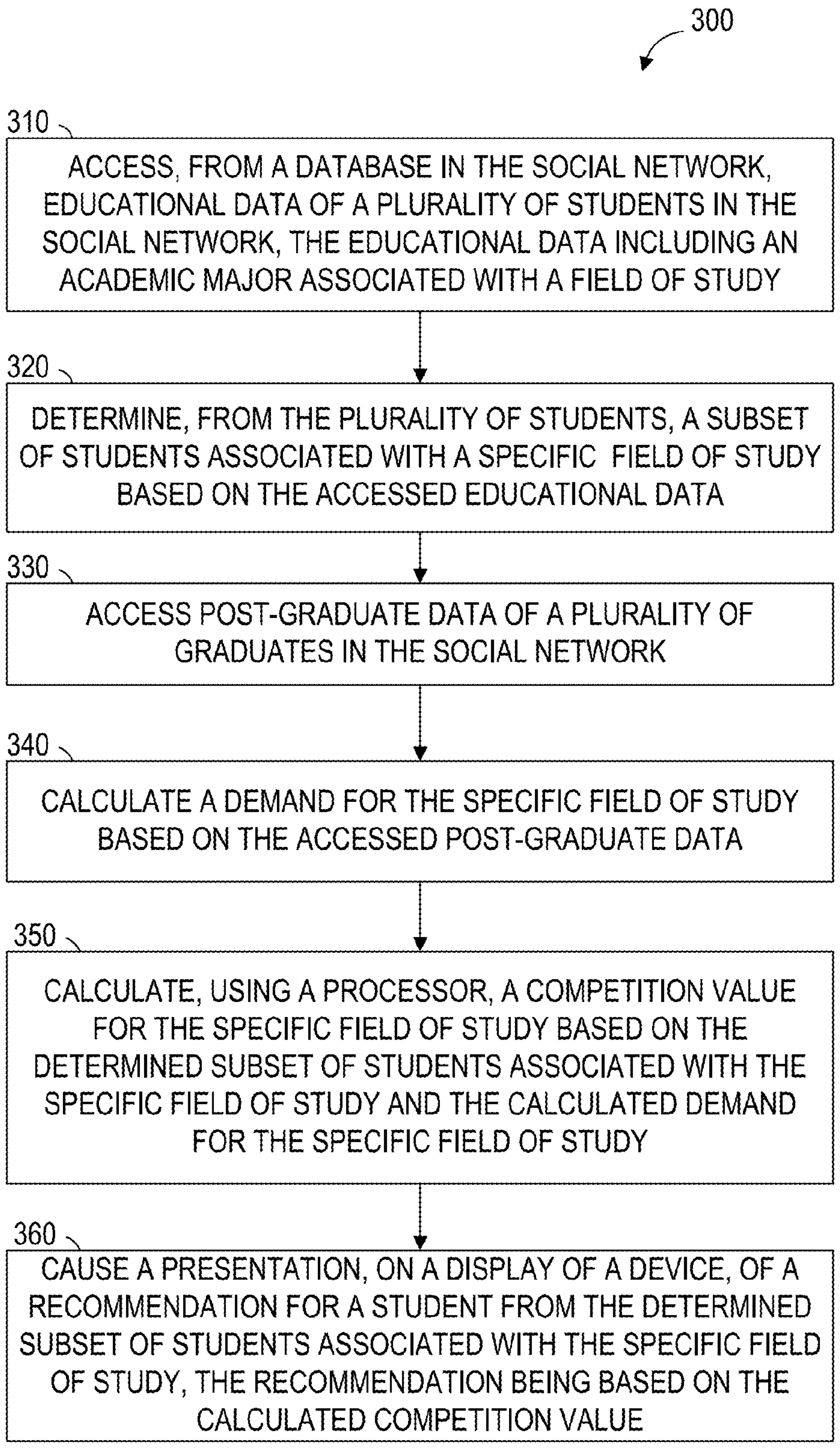
FIG. 3 is a flowchart illustrating a method for presenting a recommendation to a member of a social network in a specific field of study, according to some example embodiments.

FIG. 3 is a flowchart illustrating operations of the social network system 210 in performing a method 300 for presenting a recommendation to a member in a specific field of study, according to some example embodiments. Operations in the method 300 may be performed by the network-based system 105, using the predictor 204 an the recommendation generator 206 described above with respect to FIG. 2. As shown in FIG. 3, the method 300 includes operations 310, 320, 330, 340, 350, and 360.

At operation 310, the social network system 210 can access educational data 212 of a plurality of students in the social network (e.g., social network system 210). In some instances, the students are college students. For example, the educational data 212 can be accessed from a database in the social network system 210. The database can store the member data 218, such as the educational data 212. Additionally, the accessed educational data 212 can include an academic major associated with a field of study. In some instances, the educational data 212 can be stored in the social network system 210, and can include information available in the profile data 211 of members in the social network system 210.

As previously mentioned, the educational data 212 can include a school currently being attended by the member, a major being studied by the member, a minor being studied by the member, a school ranking of the member, a GPA, a location of the member, skills possessed by the member, professional organizations associated with the member, and so on.

At operation 320, the social network system 210 can determine, from the plurality of students, a subset of students associated with a specific field of study based on the accessed educational data 212. For example, the predictor 204 can determine the current and future supply of students in a specific field of study based on the educational data 212. The determination performed at operation 320 is further described in method 400 of FIG. 4. In some instances, part of the determination at operation 320 can be performed offline using the offline data processor 220.

In some instances, the supply of talent for each field of study (e.g., subset of the students for each field of study) can be based on the student's university, similar university based on rankings, geographic location, GPA, and so on. For example the subset of the students associated with a specific field of study can be filtered based on the geographic location, since jobs located in city A are more likely to be taken by students near city A.

At operation 330, the social network system 210 can access post-graduate data of a plurality of graduates in the social network. In some instances, the graduates are college graduates. For example, the post-graduate data can be accessed from a database that stores the member data 218. The member data 218 can include the post-graduate data 213. Additionally, the accessed post-graduate data 213 can include the employment status of the graduate, the number of graduates in a specific job role based on educational characteristics (e.g., major, minor, school, GPA, and so on) of a member. The post-graduate data 213 can include graduate school enrollment information (e.g., graduate school major, ranking of graduate school, acceptance rate of graduate school).

In some instances, the post-graduate data 213 can be accessed for graduates who have graduated college within less than a predetermined number of years (e.g., one, two, five, and ten) from the present time. For example, the post-graduate data 213 can be accessed for the college graduates that have graduated from college less than two years ago.

At operation 340, the social network system 210 can calculate a demand for the specific field of study based on the post-graduate data accessed at operation 330. For example, the predictor 204 can calculate the current demand and future demand of students in a specific field of study based on the post-graduate data 213. The calculation performed at operation 340 is further described in method 500 of FIG. 5. In some instances, part of the calculation at operation 340 can be performed offline using the offline data processor 220.

In some instances, the demand for a specific field of study can be further calculated based on an industry, a company, a university, a geographic location, salary, and so on.

At operation 350, the social network system 210 can calculate, using a processor, a competition value for the specific field of study based on the determined subset of students associated with the specific field of study and the calculated demand for the specific field of study. For example, the recommendation generator 206 can be a special purpose computer for determining a competition value for a specific field of study. The determination performed at operation 350 is further described in method 600 of FIG. 6. In some instances, part or all of the determination at operation 350 is performed in real-time using the recommendation generator 206.

For example, the competition value for the specific field of study can be calculated by dividing the determined subset of students associated with the specific field of study by the calculated demand for the specific field of study.

At operation 360, the social network system 210 can cause a presentation, on a display of a device (e.g., devices 130, 150 of FIG. 1), of a recommendation for a student from the determined subset of students associated with the specific field of study. The recommendation can be based on the competition value calculated at operation 350. The subset of students associated with the specific field can be determined at operation 320. In some instances, the student from the determined subset can be a student majoring in an academic degree associated with the field of study. Alternatively, the student from the determined subset can be a student considering potentially majoring in an academic degree associated with the field of study, such as a high school graduate entering college. The presentation described at operation 360 is further described in method 500 of FIG. 5.

In one example, the competition value can be high when the competition value is above a predetermined threshold value. Additionally, the recommendation can be to switch to a different field of study when the competition value is high.

In another example, the competition value can be low when the competition value is below a predetermined threshold value. Additionally, the recommendation is to stay in the specific field of study when the competition value is low.

Other recommendations can include, but are not limited, to changing major, taking online courses, learning vocational skills, getting an internship early, taking a specific course, minor in a specific subject, becoming certified in a specific skill, contacting a suggested mentor, and so on.

Additionally, the recommendation can also include an alert. The alert can be an email sent to the student, an alert on a decision board of the social network system 210, or an alert presented on the profile page of the student.

In some instances, the recommendation in method 300 can further be based on a dispersion value for the specific field of study. For example, the dispersion value can be calculated by determining a number of different job types for the specific field of study. Then, the dispersion value for the specific field of study can be calculated based on the determined number of different job types. The recommendation at operation 360 can be further based on the calculated dispersion value. Method 700 of FIG. 7 further describes techniques for determining a recommendation based on the calculated dispersion value.

For example, the recommendation can include, but is not limited to, a recommendation to stay in the field of study when the dispersion value is below a predetermined threshold, or a recommendation is to switch to a different field of study when the dispersion value is above the predetermined value.

For illustration purposes, Table 1 illustrates an example of a current supply based on different field of studies.

TABLE 1

| Current Supply Example<br>Current Supply |
|---|
| Economics: 900 students |
| Computer Science: 800 students |
| History: 300 students |

Figure 4:
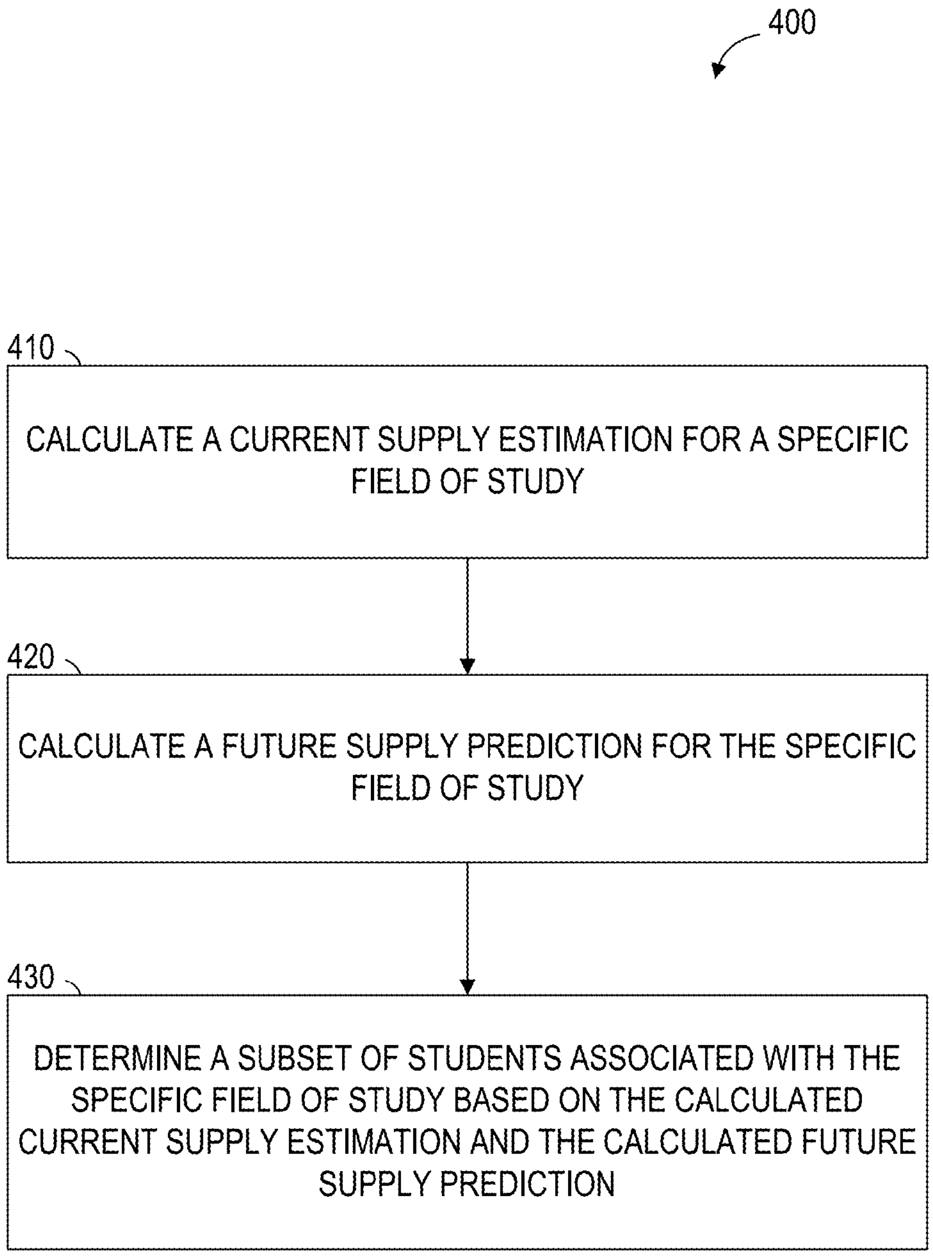
FIG. 4 is a flowchart illustrating a method for determining a supply for a field of study, according to some example embodiments.

FIG. 4 is a flowchart illustrating operations of the predictor 204 in performing a method 400 for determining a supply of students to graduate in a specific field of study, according to some embodiments. The subset of students associated with a specific field of study determined in operation 320 can be based on techniques described in FIG.

4. Operations in the method 400 may be performed by the network-based system 105, using the predictor 204 and the recommendation generator 206 described above with respect to FIG. 2. As shown in FIG. 4, the method 400 includes operations 410, 420, and 430.

The supply of current talent can include the number of students in a given field of study, or expected to graduate in a given field of study.

At operation 410, the predictor 204 can calculate (e.g., estimate) a current supply for a specific field of study. For example, the current supply can be estimated based on the major, the minor, school ranking, and GPA of a student.

In some instances, the current or future supply can be calculated based on educational information (e.g., major, minor, school ranking, or GPA) of a student. For example, by determining the number of computer science majors in their final year of college, the predictor 204 can calculate the number of students looking for a software development job next year.

At operation 420, the predictor 204 can calculate (e.g., predict) a future supply for the specific field of study. In some instances, the estimated supply of talent four years from now in a given field of study can be correlated to the current number of entering freshmen majoring in an academic major associated with the given field of study. Additionally, the estimated supply of talent in a year from now can be correlated to the current number of seniors majoring in an academic major associated with the given field of study. Furthermore, over time, the predictor 204, using machine learning techniques, can better predict student behavior of switching between majors to make predictions that are more accurate. For example, machine learning techniques, using historical data stored in the social network 210, can better calculate the probability of a student graduating in a given major based on the student's school ranking or GPA.

In some instances, the future supply can be calculated based on courses being taken by a student, and based on other majors that the student is interested in. For example, the other majors can be listed on the student's decision board.

At operation 430, the predictor 204 can determine a subset of students associated with the specific field of study based on the current supply calculated at operation 410, and the future supply calculated at operation 420. The determined subset of students associated with the specific field of study can be the expected number of students to graduate in the specific field of study at a certain date in the future (e.g., in one year, two, three, or four years). For example, the expected number of software developers in location A can be calculated by determining the number of CS majors in their final year at location A, multiplied by the graduation rate of CS majors at Location A.

Figure 5:
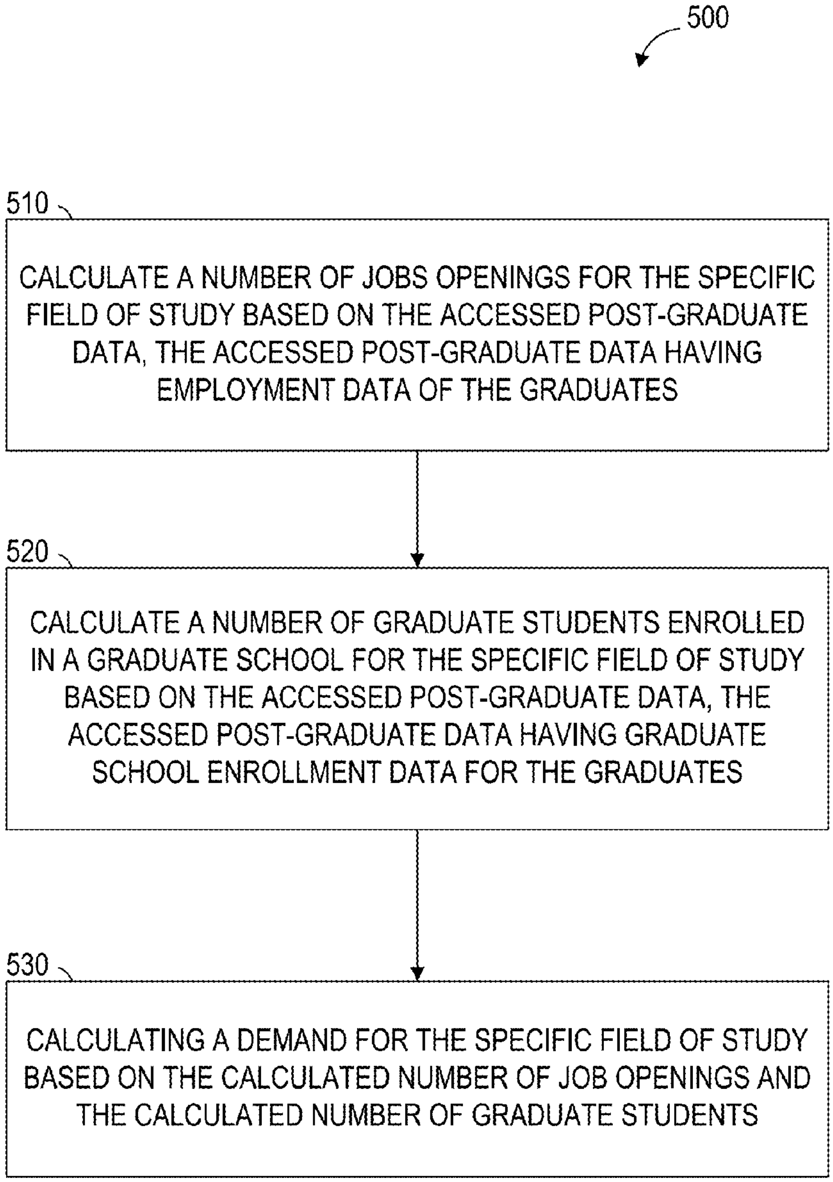
FIG. 5 is a flowchart illustrating a method for determining a demand for a field of study, according to some example embodiments.

FIG. 5 is a flowchart illustrating operations of the predictor 204 in performing a method 500 for determining a demand of students for a specific field of study at a certain time in the future, according to some embodiments. The demand for the specific field of study calculated at operation 340 of FIG. 3 can be based on techniques described in FIG. 5. Operations in the method 500 may be performed by the network-based system 105, using the predictor 204 and the recommendation generator 206 described above with respect to FIG. 2. As shown in FIG. 5, the method 500 includes operations 510, 520, and 530.

For example, the demand of students for a specific field of study can be based on the number of expected jobs available and the number of seats available in a graduate degree program.

At operation 510, the predictor 204 can calculate a number of jobs openings for the specific field of study based on the accessed post-graduate data, the accessed post-graduate data having employment data of the graduates.

For example, the social network system 210 can access the post-graduate data 213 of recently graduated students. The post-graduate data 213 can include the employment status right after graduation or within a year after graduation. Using the employment status, the predictor 204 can count the number of students within a given category (e.g., major, minor, school and GPA) associated with a specific job role (e.g., a graduate that took a specific job role).

Using the count of students associated with a specific job role, the predictor 204 can determine the composition of each job type. For example, when there are total of 100 consultants, the composition for consultants include about 50% of graduates that studied economics, 30% of graduates that studied computer science, and 20% that studied history. Therefore, 50% of the number of consultancy jobs is equal to the demand for students with an economics field of study who can be hired as consultants.

Then, the predictor 204 can count the number of current job openings for each job type. The number of current job openings can be obtained by counting the available job openings listed on a job board of the social network system 210 or third-party site. Using the same composition as calculated above and based on historical data, the predictor 204 can calculate the current number of available jobs for each field of study (e.g., based on major). For example, when it is calculated (by, e.g., the predictor 204) that there are 200 current job openings for the position of consultant, then, based on the composition that 50% of the predicted hired will have an economics major, the predictor 204 can calculate that 100 economics majors will be hired as consultants.

At operation 520, the predictor 204 can calculate a number of graduate students enrolled in a graduate school for the specific field of study based on the accessed post-graduate data 213, the accessed post-graduate data 213 having graduate school enrollment data for the graduates.

In some instances, the predictor 204 can calculate the number of seats available in a graduate program for a given field of study based on the accessed post-graduate data 213. For example, based on educational data 212 and post-graduate data 213, the predictor 204 can determine that a master of business administration (MBA) program may have a composition of 10% economics majors, 5% business majors, 4% computer science (CS) majors, 2% history majors, and so on. Using the determined composition, the predictor 204 can calculate the number of MBA seats available for an economics major.

At operation 530, the predictor 204 can calculate a demand for the specific field of study based on the calculated number of job openings and the calculated number of graduate students. The current demand estimation for the number of current jobs available and the number of current seats available can be calculated based on the post-graduate data 213 of members in the social network system 210. In some instances, the post-graduate data 213 can be of recently (e.g., less than one or two years) graduated students.

For illustration purposes, Tables 2 and 3 illustrate examples of a demand for different field of studies.

TABLE 2

| Example of Demand in Recent Past<br>Demand in Recent Past |
|---|
| Consultant: [50% Economics, 40% Computer Science, 10% History]<br>Software Developer: [5% Economics, 90% Computer Science, 5% History]<br>Unemployed: [30% Economics, 20% Computer Science, 50% History]<br>MS in CS: [5% Economics, 90% Computer Science, 5% History] |

TABLE 3

| Current Demand Example<br>Current Demand |
|---|
| Consultant: 1000 jobs<br>Software Developer: 700 jobs<br>MS in CS: 500 seats<br>Demand for Economics = (50% of 1000) + (5% of 700) + (5% of 500) = 555 jobs<br>Demand for CS = (40% of 1000) + (90% of 700) + (90% of 500) = 1480 jobs<br>Demand for History = (10% of 1000) + (5% of 700) + (5% of 500) = 155 jobs |

Additionally, method 500 can calculate future demand for a specific field of study. Future demand can be calculated by determining the number of jobs and available graduate school seats available for a student in a given field of study once the student graduates. In some instances, in order to determine these trends, the predictor 204 can access the post-graduate data 213 to determine the future prospects for the field of study (e.g., analyze trends to determine if the number of jobs is growing, shrinking, or stable). Furthermore, the predictor 204 can update the determining and calculating algorithms using machine learning techniques.

Figure 6:
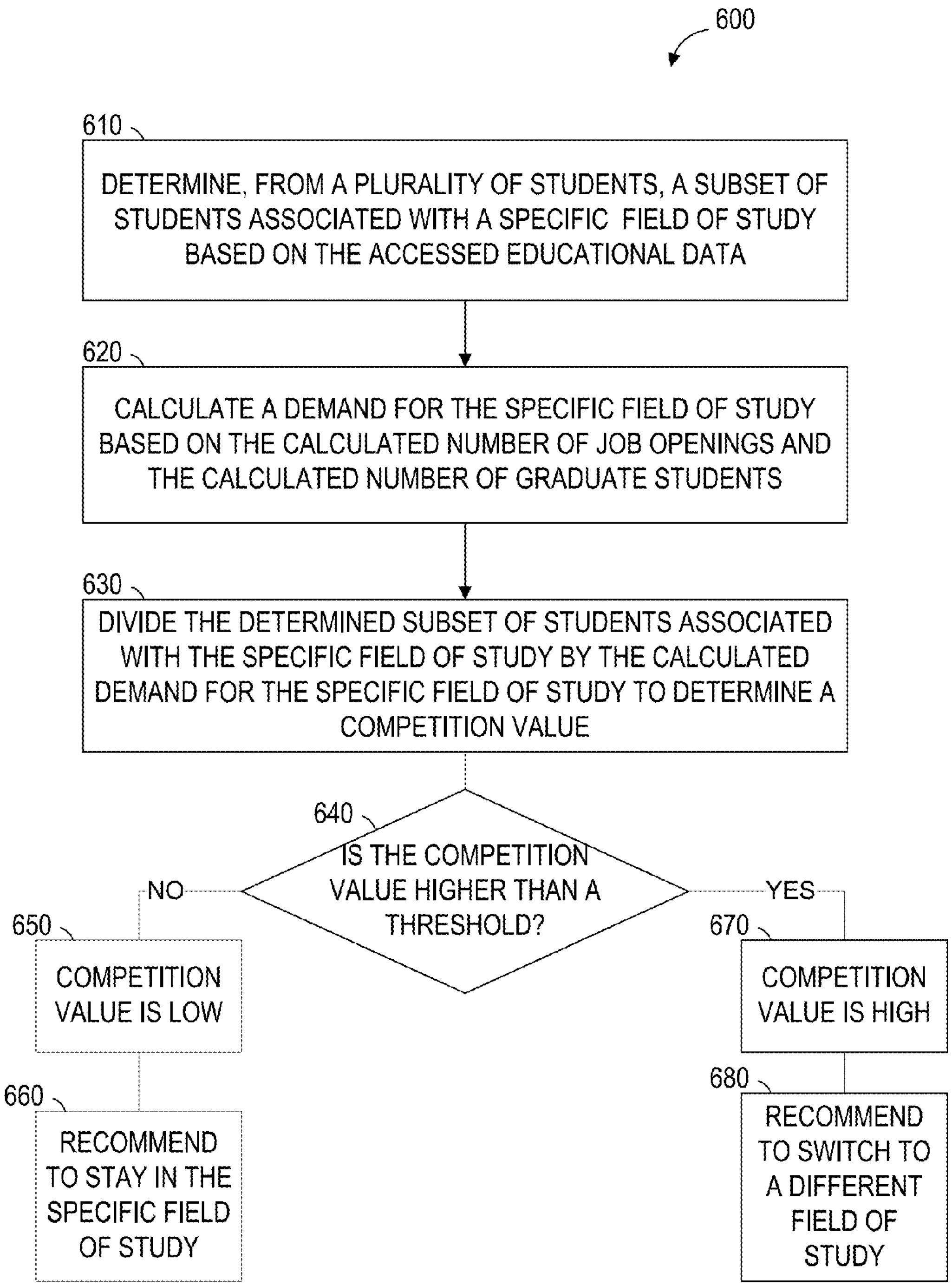
FIG. 6 is a flowchart illustrating a method for determining a competition value and determining a recommendation based on the competition value, according to some example embodiments.

FIG. 6 is a flowchart illustrating operations of the predictor 204 and the recommendation generator 206 in performing a method 600 for determining a competition value and determining a recommendation based on the competition value, according to some embodiments. The competition value calculated at operation 350 and the recommendation presented at operation 360 of FIG. 3 can be based on techniques described in FIG. 6. Operations in the method 600 may be performed by the network-based system 105, using the predictor 204 and the recommendation generator 206 described above with respect to FIG. 2. As shown in FIG. 6, the method 600 includes operations 610, 620, 630, 640, 650, 660, 670 and 680.

At operation 610, the predictor 204 can determine, from a plurality of students, a subset of students associated with a specific field of study based on the accessed educational data 213. As previously described in FIG. 4, method 400 describes techniques for determining the supply for the specific field of study.

At operation 620, the predictor 204 can calculate a demand for the specific field of study based on the calculated number of job openings and the calculated number of graduate students. As previously described in FIG. 5, method 500 describes techniques for calculating the demand for the specific field of study.

At operation 630, the recommendation generator 206 can divide the determined subset of students associated with the specific field of study by the calculated demand for the specific field of study to determine a competition value.

In some instances, a field of study has low competition among students when the supply is low and the demand is high. Alternatively, the field of study has a high competition among students when the supply is high and the demand is low.

For example, the recommendation generator 206 can calculate the competition value using the equations below:

Supply($X$)=Total number of people in field of study $X$, in a given year;

Demand($X$)=Demand(Job1,$X$)+Demand(Job2,$X$)+Demand(Post-Grad-Program 1,$X$)+ . . . +Demand(Post-Grad-Program 2,$X$); and Competition($X$)=Supply($X$)/Demand($X$).

The competition value can be in the range of 0 to infinity. The predetermined threshold to determine if the competition value is high or low can be preset by an administrator or determined by the social network system 210 using machine learning techniques. Thus, a competition value above a certain threshold may be labeled "high" and competition values below another threshold can be labeled "low" with competition values between the thresholds being labeled as "medium". Values equal to the thresholds may be placed in one bucket or the other depending on the implementation. An example of a threshold value is 1.0, which infers that the supply equals the demand. Continuing with the example, when the competitive value is below 1.0, the competition is low because there is more available jobs than graduates looking for those jobs.

For illustration purposes, Table 4 illustrates an example of competition value determination for different fields of study.

TABLE 4

| Example of competition value determination<br>Current Competition |
|---|
| Demand for Economics = 555 jobs<br>Supply for Economics = 900 students<br>Competition in Economics = 900/555 = High<br>Demand for CS = 1480 jobs<br>Supply for CS = 800 students<br>Competition in CS = 800/1480 = Low<br>Demand for History = 155 jobs<br>Supply for History = 300 students<br>Competition in History = 300/155 = High |

Continuing with method 600, at operation 640, the recommendation generator 206 can determine if the competition value is higher than a preset threshold. The threshold can be set by an administrator, or calculated by the recommendation generator 206 using machine learning techniques.

When the competition value is lower than the threshold, at operation 650, the recommendation generator 206 labels the competition as low and recommends the student to stay in the specific field of study at operation 660.

Alternatively, when the competition value is higher than the threshold, at operation 670, the recommendation generator 206 labels the competition as high and recommends the student to switch to a different field of study at operation 680.

Figure 7:
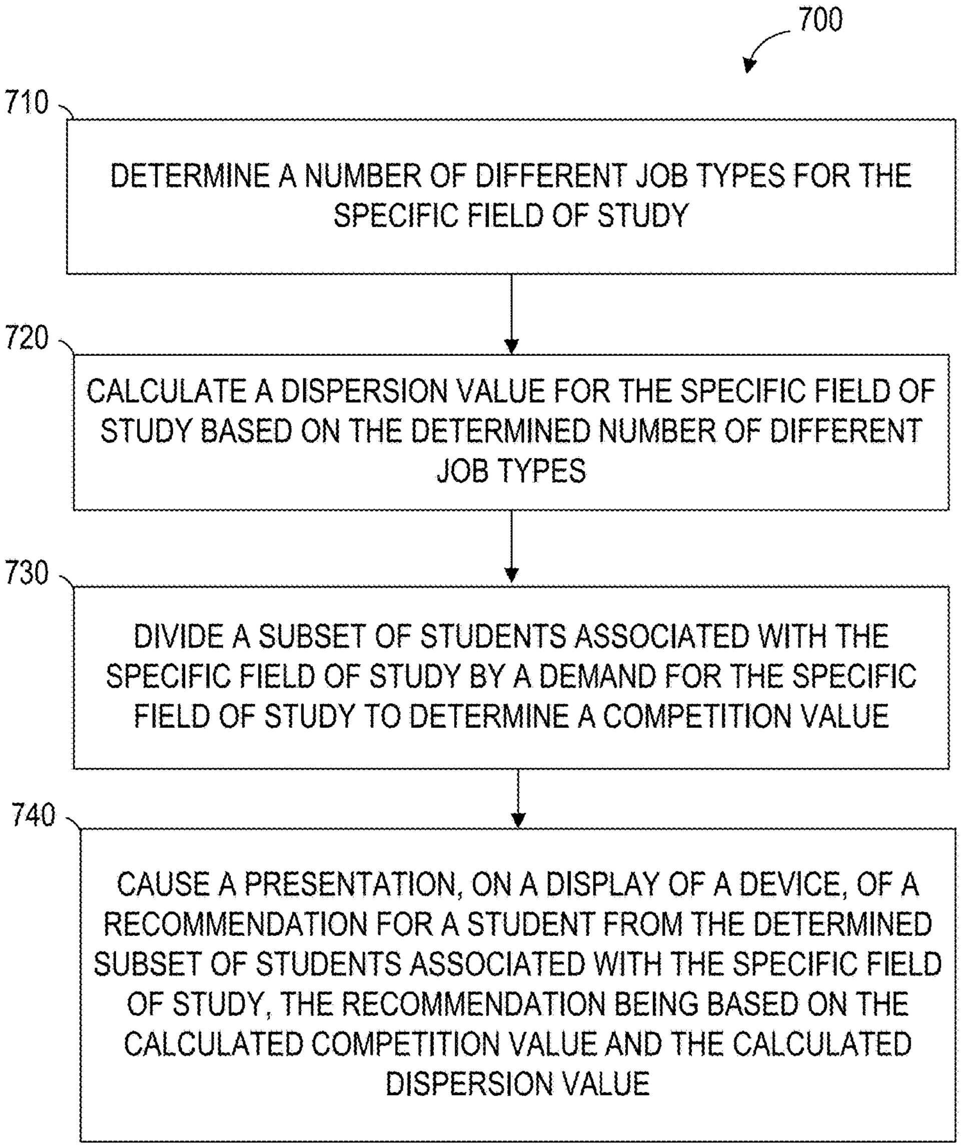
FIG. 7 is a flowchart illustrating a method for determining a dispersion value and determining a recommendation based on a competition value and the dispersion value, according to some example embodiments.

FIG. 7 is a flowchart illustrating a method 700 for determining a competition value and a dispersion value and determining a recommendation based on the competition value and dispersion value, according to some embodiments. In some instances, the recommendation presented to the student at operation 360 of FIG. 3 can be based on techniques described in FIG. 7. Operations in the method 700 may be performed by the network-based system 105, using the predictor 204 and the recommendation generator 206 described above with respect to FIG. 2. As shown in FIG. 7, the method 700 includes operations 710, 720, 730, and 740.

At operation 710, the predictor 204 can determine a number of different job types for the specific field of study. In some instances, two job types are considered different if the standardized job title is different. For example, normalization can also include determining a standardized industry for the company, standardized job titles, and standardized job functions. The standardized industry, job title, and job function can be accessed from the standardized job nomenclature data 217.

At operation 720, the predictor 204 can calculate a dispersion value for the specific field of study based on the determined number of different job types.

In some instances, the dispersion value can be low when a student in a given field of study has a pre-defined path for placement. For example, a computer science major is more likely to become a software developer.

Alternatively, the dispersion value can be high when a student in a given field of study can be placed in a wide variety of jobs functions and industries. For example, a history major can become a consultant, go to business graduate school, or become a teacher.

For example, the predictor 204 can determine the dispersion value by taking a sample set containing only graduates that have graduated within two years and have been employed within a year after graduation using the equations below:

$A(X)$=Determine total number of people who studied $X$ and either got employed at a company or got accepted into a post-graduate program;

$B(X,\text{Job1})$=(100*Total number of people in field of study $X$, who were hired for Job1 right after college)/$A(X)$;

$C(X,\text{Prog1})$=(100*Total number of people in field of study $X$, who were enrolled in Post-grad program Prog 1 right after college)/$A(X)$; and $$\text{Dispersion}(X) = D_x = \frac{100}{\sqrt{B(X,\text{Job1})^2 + B(X,\text{Job2})^2 + B(X,\text{Job3})^2 + \ldots + C(X,Prog1)^2 + C(X,Prog2)^2 + \ldots}}$$

The dispersion value can be in a range from 1 to 10, where a predetermined or dynamically calculated (e.g., median dispersion) threshold (e.g., three, four, five, or six) can determine if the dispersion is low or high for a given field of study.

Continuing with method 700, at operation 730, the recommendation generator 206 can divide a subset of students associated with the specific field of study by a demand for the specific field of study to determine a competition value. As previously described, FIGS. 4 and 5 describe techniques for determining a subset of students and calculating a demand.

At operation 740, the recommendation generator 206 can cause a presentation, on a display of a device, of a recommendation for a student from the determined subset of students associated with the specific field of study, the recommendation being based on the calculated competition value and calculated dispersion value.

FIG. 8 illustrates a table 800 for recommendation and alert generation based on the competition value and the dispersion value, according to some embodiments.

In some instances, the recommendation generator 206 can determine a first threshold value for classifying the competition value as high or low, and a second threshold value for classifying the dispersion value as high or low.

For example, the first threshold value can be determined by accessing the total supply and demand across all the fields of study and finding an average value. The average value can be the first threshold value. Alternatively, the median value can be the first threshold value. Additionally, the second threshold value can be determined using similar methods as described for the first threshold value.

When the dispersion value is low and the competition value is high, the recommendation can be to switch the field of study, as illustrated in box 810. The switch recommendation can also include a suggestion to select another major, minor, online courses, or vocational trainings.

When the dispersion value is low and the competition value is low, the recommendation can be to stay in the field of study, as illustrated in box 820.

When the dispersion value is high and the competition value is high, the recommendation can be to switch, or stand out and be proactive, as illustrated in box 830. The stand out recommendation can include a suggestion to take a minor, additional online course, or additional vocational training. The proactive recommendation can include a suggestion to do an internship early, or suggest a mentor to connect with.

When the dispersion value is high and the competition is low, the recommendation can be to stay in the field of study and to be proactive, as illustrated in box 840.

FIGS. 9-12 are user interface diagrams illustrating an example of a recommendation and alerts based on the competition value and dispersion value obtained using methods 300, 400, 500, 600, and 700, according to some embodiments.

Figure 9:
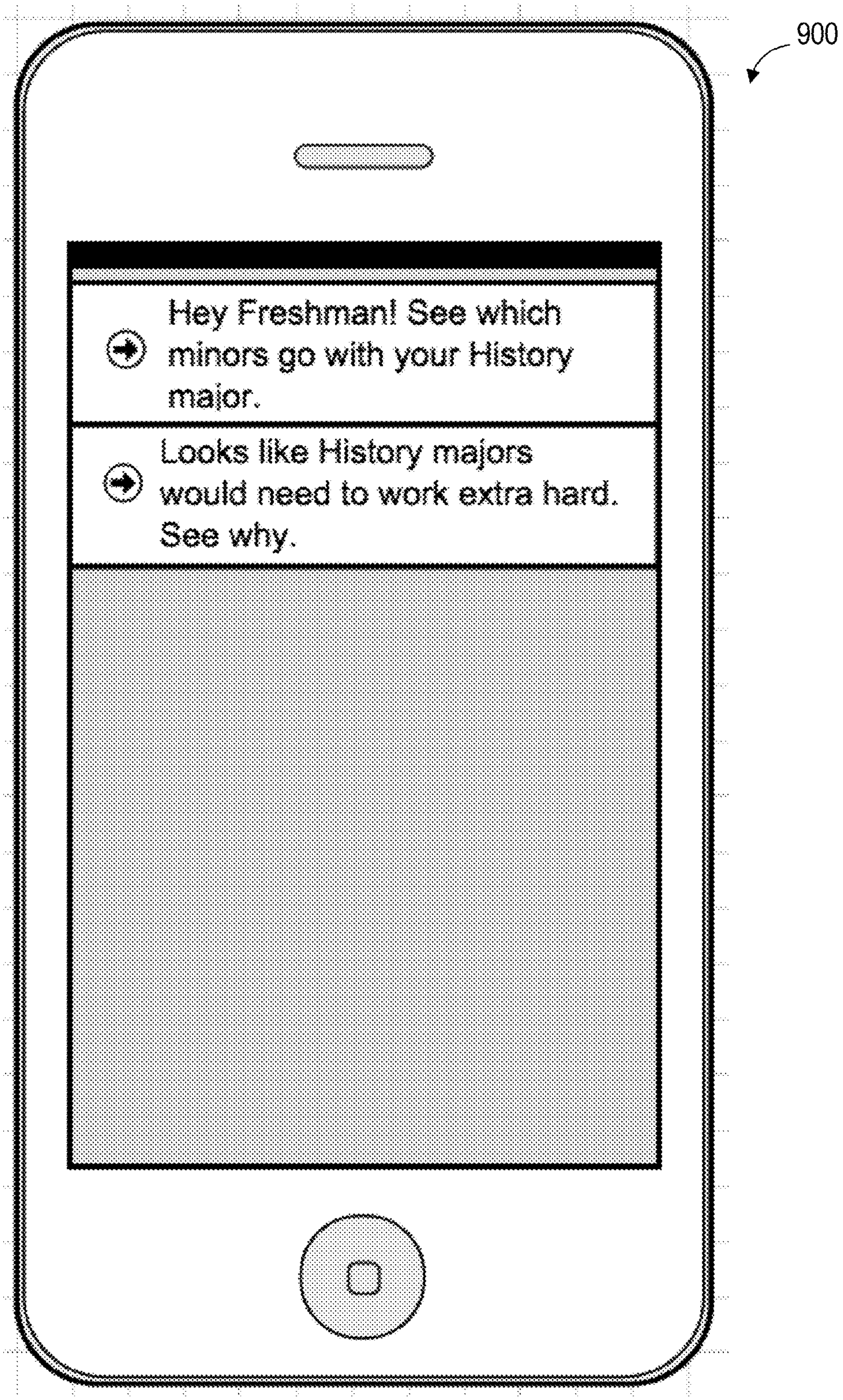
FIGS. 9-12 are user interface diagrams illustrating an example of a recommendation and alerts based on a competition value and a dispersion value, according to some embodiments.

The user interface 900 in FIG. 9 presents some recommendations for a freshman student majoring in history. In this example, given that the History field of study has a high competition value, the user interface 202 presents recommendation such as a suggestion to take a minor or to work hard.

Figure 10:
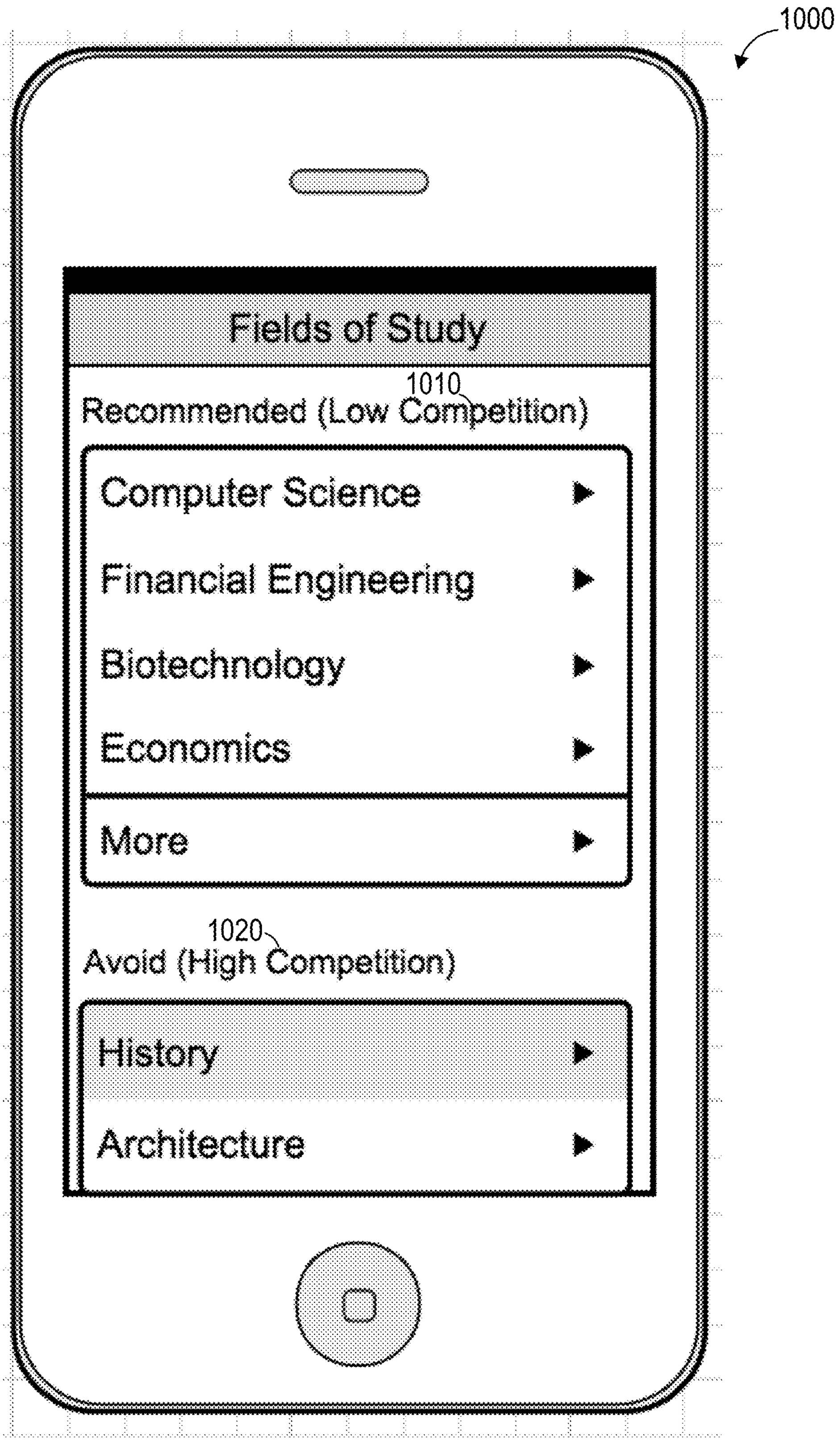

The user interface 1000 in FIG. 10 presents various recommendations of majors to take based on a low competition 1010, and majors to avoid based on high competition 1020. In this example, based on the competition value calculated in methods 300-700, the user interface 202 can present recommended field of studies (e.g., computer science, engineering), and the user interface can present field of studies to avoid.

Figure 11:
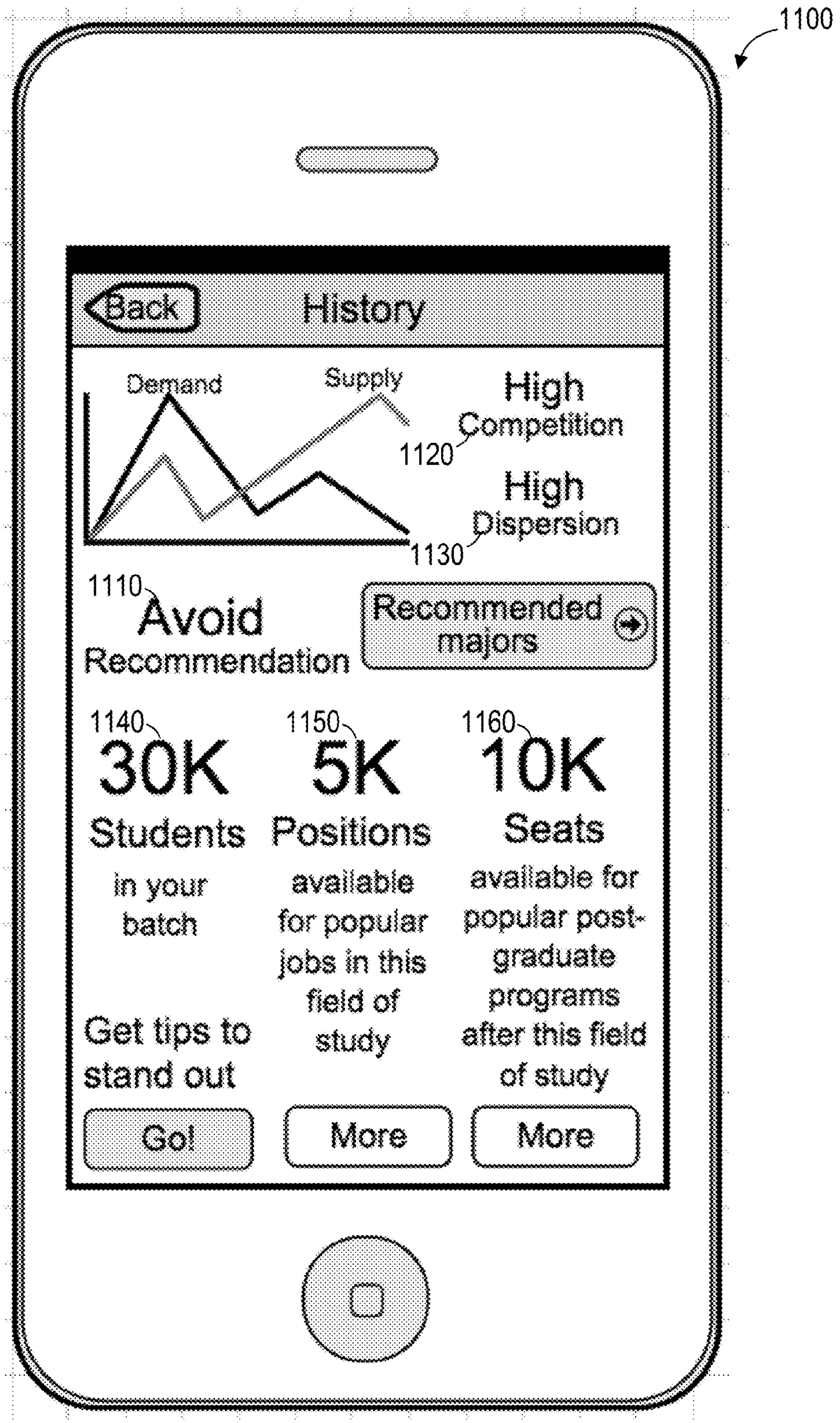

The user interface 1100 in FIG. 11 presents information about a field of study (e.g., history), and a recommendation 1110 for the field of study on an application in a mobile device. In this example, the recommendation 1110 is to avoid this field of study based on the high competition value 1120 and the high dispersion value 1130. Additionally, the recommendation generator 206 can present the future supply 1140 of history graduates, and future job demand 1150 for history graduates, and the future number of seats available 1160 for history graduates.

Figure 12:
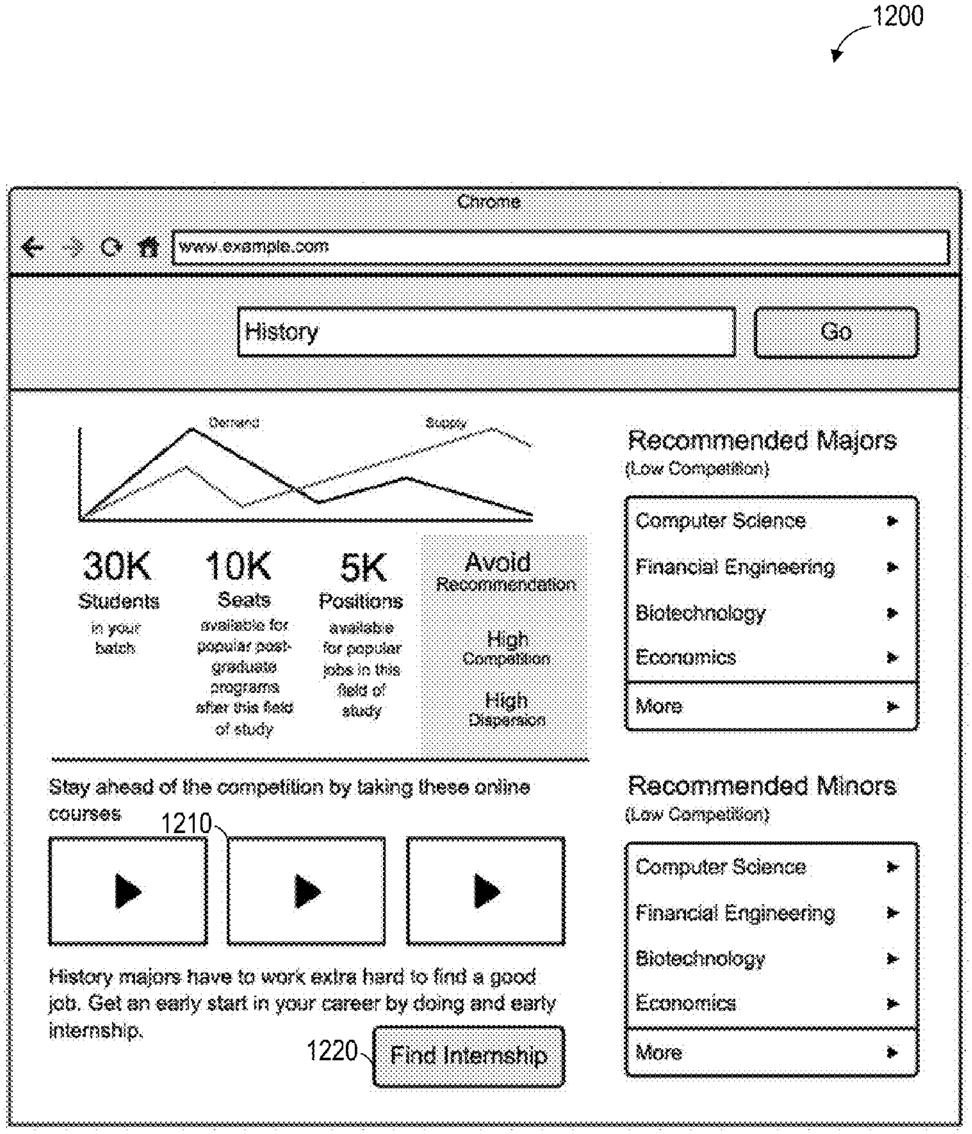

The user interface 1200 in FIG. 12 presents similar information as in FIG. 11, but the user interface 1200 is presented on a web browser of a desktop computer. As illustrated in FIG. 12, the recommendation can be tailored based on the user interface used to present the recommendation. In this example, the recommendation is presented on the web browser, so the user interface 202 also includes suggestions to take online courses 1210, and to find an internship 1220.

Figure 13:
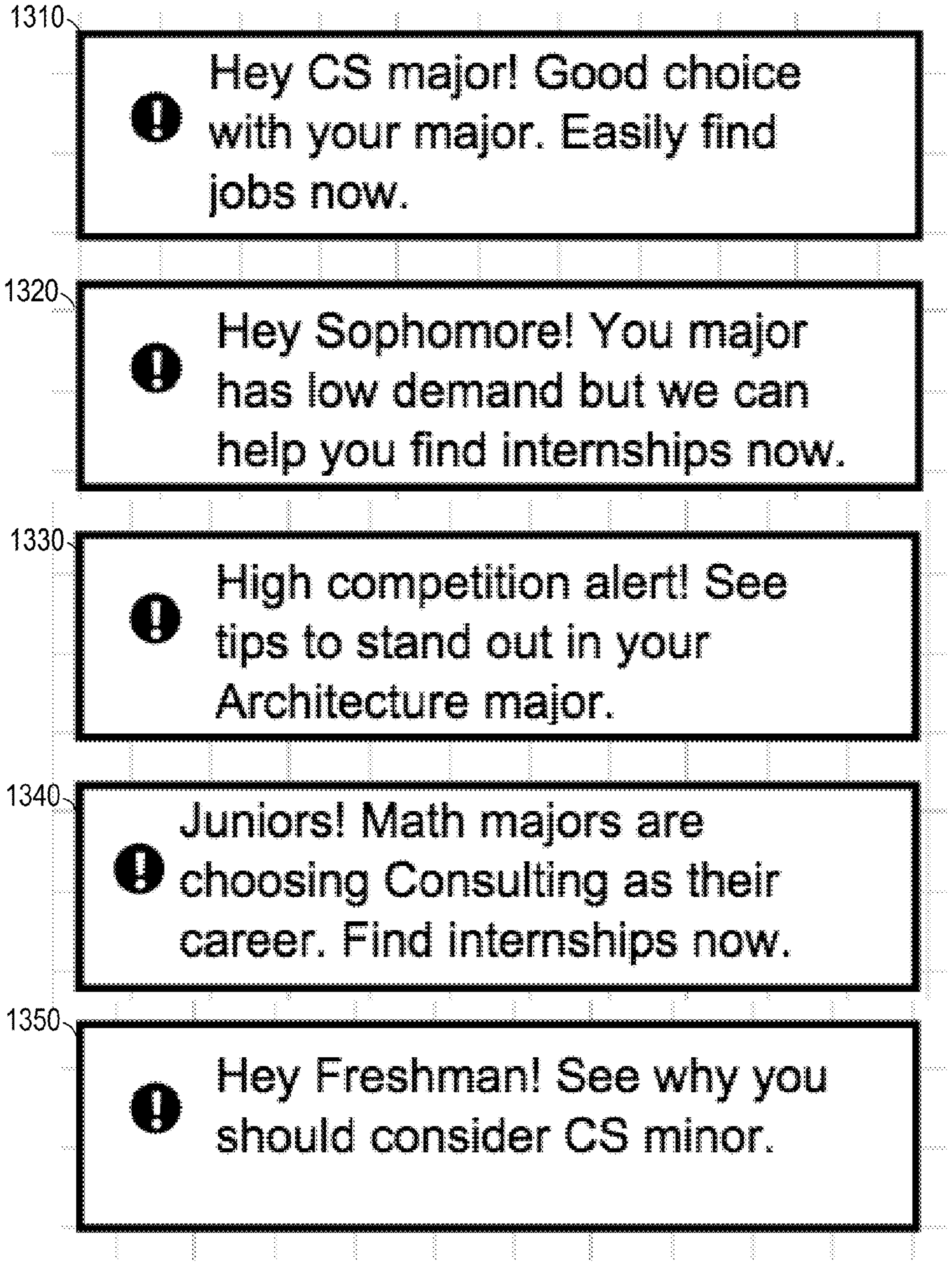
FIG. 13 illustrates sample recommendations based on a competition value and a dispersion value, according to some embodiments.

FIG. 13 illustrates sample recommendations 1310, 1320, 1330, 1340, and 1350 based on the competition value and dispersion value obtained using methods 300, 400, 500, 600, and 700, according to some embodiments.

According to various example embodiments, one or more of the methodologies described herein may facilitate automatic generation of recommendation and alert based on the member data 218. Additionally, based on the database structure illustrated in FIG. 2, the recommendations and alerts can be sent to a member in real-time by using the offline data processor to calculate the competition value and the dispersion value for each field of study offline. Furthermore, the social network system 210 stores and indexes the member data 218, especially the educational data 212 and the post-graduate data 213, in such a way as to allow an efficient retrieval and processing of the information in order to present the recommendations and alerts in real-time.

When these effects are considered in aggregate, one or more of the methodologies described herein may obviate a need for certain human efforts or resources that otherwise would be involved in generating the recommendations and alerts. Additionally, the methodologies described herein facilitate efficient marketing, which can increase revenues and sales. Furthermore, computing resources used by one or more machines, databases, or devices (e.g., within the network environment 100) may similarly be reduced (e.g., by pre-determining sites to ingest company information, by automatically triggering the alerts and recommendation). Examples of such computing resources include processor cycles, network traffic, memory usage, data storage capacity, power consumption, and cooling capacity.

Example Machine Architecture and Machine-Readable Medium

Figure 14:
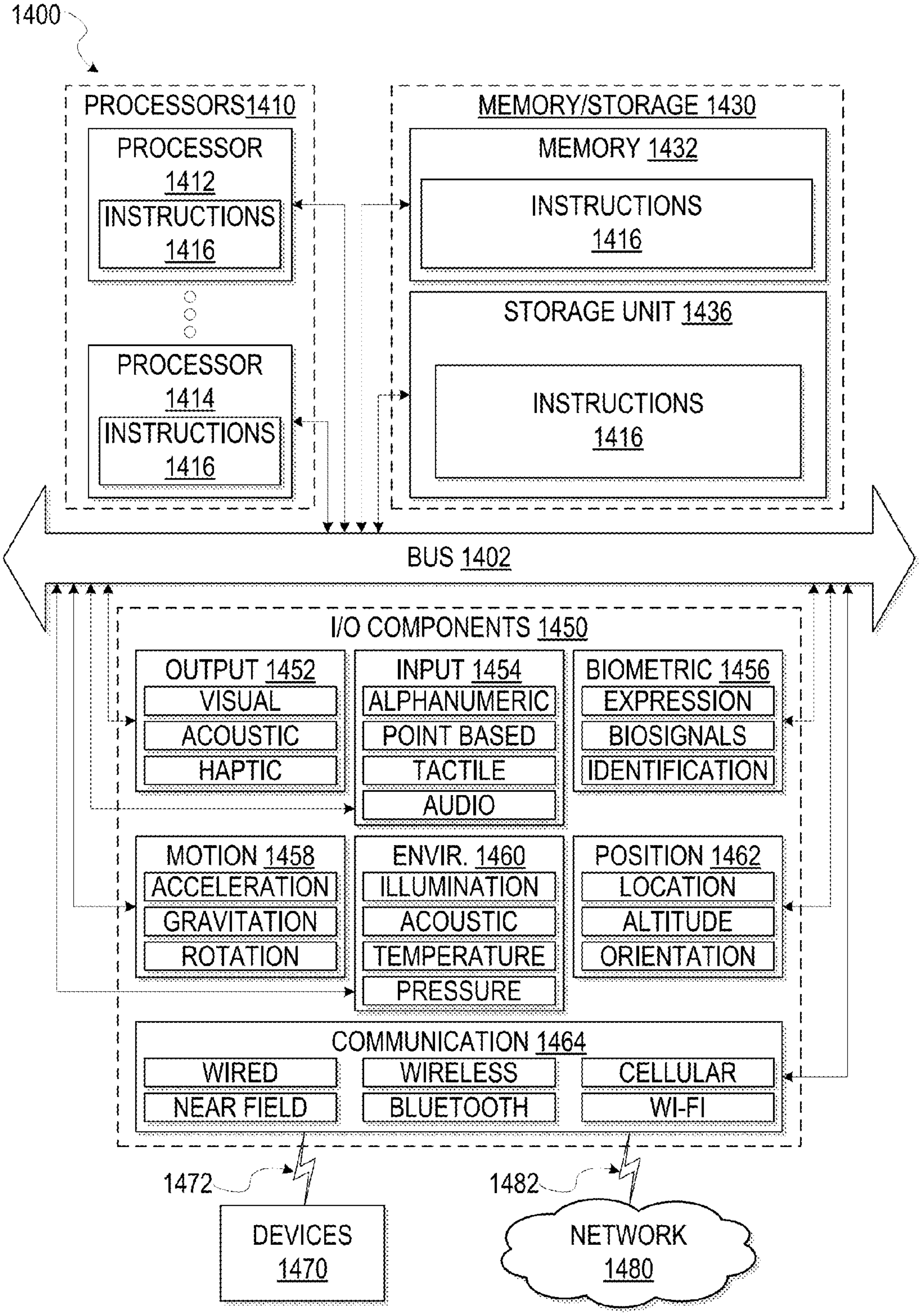
FIG. 14 is a block diagram illustrating components of a machine, according to some example embodiments, able to read instructions from a machine-readable medium and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions may cause the machine to execute the flow diagrams of FIGS. 3-7. Additionally, or alternatively, the instructions may implement the predictor 204 or the recommendation generator 206 of FIG. 2, and so forth. The instructions transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include multi-core processor that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core process), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472 respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible company, and such a tangible company may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

accessing, from a database in a social network, educational data of a plurality of students in the social network, the educational data including an academic major associated with a field of study;

determining, from the plurality of students, a subset of students associated with a specific field of study based on the accessed educational data;

accessing post-graduate data of a plurality of graduates in the social network;

calculating a demand for the specific field of study based on the accessed post-graduate data;

calculating, using a processor, a competition value for the specific field of study based on the determined subset of students associated with the specific field of study and the calculated demand for the specific field of study;

receiving an update to a member profile of a social network by a member of the social network, the update comprising an educational institution that a member associated with the member profile intends to attend;

in response to the update of the member profile, automatically generating a recommendation for an academic major associated with the educational institution, wherein the recommendation is based on the competition value having been previously calculated;

causing a display of a first portion and a second portion of a first graphical user interface, wherein:

the first portion comprises a plurality of selectable recommended academic majors associated with the educational institution, wherein the plurality of selectable recommended academic majors comprises the academic major determined from the competition value having been previously calculated; and the second portion comprises a plurality of selectable academic majors to avoid associated with the educational institution; and in response to a selection of an academic major selected from the displayed first portion or the displayed second portion, causing a display of a second graphical user interface, wherein the second graphical user interface comprises the recommendation for the selected academic major and at least one graphic illustrating a corresponding demand and supply for the selected academic major.

2. The method of claim 1, wherein the calculating of the demand for the specific field of study includes:

calculating a number of job openings for the specific field of study based on the accessed post-graduate data, the accessed post-graduate data having employment data of the graduates; and wherein the demand for the specific field of study is based on the calculated number of job openings available for the field of study.

3. The method of claim 1, wherein the calculating of the demand for the specific field of study includes:

calculating a number of graduate students enrolled in a graduate school for the specific field of study based on the accessed post-graduate data, the accessed post-graduate data having graduate school enrollment data for the graduates; and wherein the demand for the specific field of study is based on the calculated number of graduate students.

4. The method of claim 1, wherein the post-graduate data is accessed for the college graduates that have graduated from college less than two years ago.

5. The method of claim 1, wherein the competition value for the specific field of study is calculated by dividing the determined subset of students associated with the specific field of study by the calculated demand for the specific field of study.

6. The method of claim 5, wherein the competition value is high when the competition value is above a predetermined threshold value; and wherein the recommendation is to switch to a different field of study when the competition value is high.

7. The method of claim 5, wherein the competition value is low when the competition value is below a predetermined threshold value, and wherein the recommendation is to stay in the specific field of study when the competition value is low.

8. The method of claim 1, further comprising:

determining a number of different job types for the specific field of study; and calculating a dispersion value for the specific field of study based on the determined number of different job types, wherein the recommendation is further based on the calculated dispersion value.

9. The method of claim 8, wherein the recommendation is to stay in the field of study when the dispersion value is below a predetermined threshold.

10. The method of claim 8, wherein the recommendation is to switch to a different field of study when the dispersion value is above the predetermined threshold.

11. The method of claim 1, wherein the recommendation is related to an internship.

12. The method of claim 1, wherein the recommendation is to take a specific course.

13. The method of claim 1, wherein the recommendation is to become certified in a specific skill.

14. The method of claim 1, wherein the students are college students, and wherein the graduates are college graduates.

15. A non-transitory machine-readable storage medium comprising instructions that, when executed by one or more processors of a machine, cause the machine to perform operations comprising:

accessing, from a database in a social network, educational data of a plurality of students in the social network, the educational data including an academic major associated with a field of study;

determining, from the plurality of students, a subset of students associated with a specific field of study based on the accessed educational data;

accessing post-graduate data of a plurality of graduates in the social network;

calculating a demand for the specific field of study based on the accessed post-graduate data;

calculating, using a processor, a competition value for the specific field of study based on the determined subset of students associated with the specific field of study and the calculated demand for the specific field of study;

receiving an update to a member profile of a social network by a member of the social network, the update comprising an educational institution that a member associated with the member profile intends to attend;

in response to the update of the member profile, automatically generating a recommendation for an academic major associated with the educational institution, wherein the recommendation is based on the competition value having been previously calculated;

causing a display of a first portion and a second portion of a first graphical user interface, wherein:

the first portion comprises a plurality of selectable recommended academic majors associated with the educational institution, wherein the plurality of selectable recommended academic majors comprises the academic major determined from the competition value having been previously calculated; and the second portion comprises a plurality of selectable academic majors to avoid associated with the educational institution; and in response to a selection of an academic major selected from the displayed first portion or the displayed second portion, causing a display of a second graphical user interface, wherein the second graphical user interface comprises the recommendation for the selected academic major and at least one graphic illustrating a corresponding demand and supply for the selected academic major.

16. The storage medium of claim 15 further comprising instructions that cause the machine to perform operations comprising:

calculating a number of job openings for the specific field of study based on the accessed post-graduate data, the accessed post-graduate data having employment data of the graduates;

calculating a number of graduate students enrolled in a graduate school for the specific field of study based on the accessed post-graduate data, the accessed post-graduate data having graduate school enrollment data for the graduates; and wherein the demand for the specific field of study is based on the calculated number of job openings available for the field of study and the calculated number of graduate students.

17. The storage medium of claim 15 wherein the competition value for the specific field of study is calculated by dividing the determined subset of students associated with the specific field of study by the calculated demand for the specific field of study.

18. The storage medium of claim 17 wherein the competition value is high when the competition value is above a predetermined threshold value, and wherein the recommendation is to switch to a different field of study when the competition value is high.

19. The storage medium of claim 15 further comprising instructions that cause the machine to perform operations comprising:

determining a number of different job types for the specific field of study; and calculating a dispersion value for the specific field of study based on the determined number of different job types, wherein the recommendation is further based on the calculated dispersion value.

20. A social network system comprising:

one or more member profile databases having educational data and post-graduate data, the educational data including an academic major associated with a field of study; and one or more hardware processors communicatively coupled to the one or more member profile databases that, having executed a plurality of computer-executable instructions, configure the social network system to:

access the educational data of a plurality of students in the social network system;

determine, from the plurality of students, a subset of students associated with a specific field of study based on the accessed educational data; and access the post-graduate data of a plurality of graduates in the social network system;

calculate a demand for the specific field of study based on the accessed post-graduate data;

calculate a competition value for the specific field of study based on the determined subset of students associated with the specific field of study and the calculated demand for the specific field of study;

receive an update to a member profile of a social network by a member of the social network, the update comprising an educational institution that a member associated with the member profile intends to attend;

in response to the update of the member profile, automatically generate a recommendation for an academic major associated with the educational institution, wherein the recommendation is based on the competition value having been previously calculated;

cause a display of a first portion and a second portion of a first graphical user interface, wherein:

the first portion comprises a plurality of selectable recommended academic majors associated with the educational institution, wherein the plurality of selectable recommended academic majors comprises the academic major determined from the competition value having been previously calculated; and the second portion comprises a plurality of selectable academic majors to avoid associated with the educational institution; and in response to a selection of an academic major selected from the displayed first portion or the displayed second portion, cause a display of a second graphical user interface, wherein the second graphical user interface comprises the recommendation for the selected academic major and at least one graphic illustrating a corresponding demand and supply for the selected academic major.

* * * * *

UNITED STATES PATENT AND TRADEMARK OFFICE

CERTIFICATE OF CORRECTION

PATENT NO. : 10,459,988 B2
APPLICATION NO. : 14/815557
DATED : October 29, 2019
INVENTOR(S) : Goel et al.

It is certified that error appears in the above-identified patent and that said Letters Patent is hereby corrected as shown below:

In the Claims

In Column 23, Line 27, in Claim 6, delete “value;” and insert --value,-- therefor Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*